United States Patent
Roehrl et al.

(10) Patent No.: US 11,091,040 B2
(45) Date of Patent: Aug. 17, 2021

(54) METHOD AND APPARATUS FOR TRIGGERING AN EMERGENCY SHUTDOWN OF THE INDUCTIVE CHARGING OF A MOTOR VEHICLE

(71) Applicant: CONTINENTAL AUTOMOTIVE GMBH, Hannover (DE)

(72) Inventors: Thomas Roehrl, Barbing (DE); Stephan Bartz, Thumhausen (DE); Gerhard Lex, Neutraubling (DE)

(73) Assignee: Vitesco Technologies GmbH, Hannover (DE)

( * ) Notice: Subject to any disclaimer, the term of this patent is extended or adjusted under 35 U.S.C. 154(b) by 338 days.

(21) Appl. No.: 16/309,215

(22) PCT Filed: Jun. 27, 2017

(86) PCT No.: PCT/EP2017/065905
§ 371 (c)(1),
(2) Date: Dec. 12, 2018

(87) PCT Pub. No.: WO2018/002082
PCT Pub. Date: Jan. 4, 2018

(65) Prior Publication Data
US 2019/0160950 A1     May 30, 2019

(30) Foreign Application Priority Data
Jun. 30, 2016   (DE) .................... 10 2016 211 804.8

(51) Int. Cl.
*B60L 3/04*   (2006.01)
*B60L 3/00*   (2019.01)
(Continued)

(52) U.S. Cl.
CPC ............... *B60L 3/04* (2013.01); *B60L 3/0069* (2013.01); *B60L 53/122* (2019.02);
(Continued)

(58) Field of Classification Search
CPC ........ B60L 3/04; B60L 53/122; B60L 53/126; B60L 53/305; B60L 3/0069;
(Continued)

(56) References Cited

U.S. PATENT DOCUMENTS 9,827,863 B2    11/2017  Bartz et al.
2009/0015210 A1*  1/2009  Kojima ..................... B60L 3/04
                                                                320/163
(Continued)

FOREIGN PATENT DOCUMENTS

DE    102014202163 A1    8/2015
DE    102010042395    *  3/2016
(Continued)

*Primary Examiner* — Russell Frejd
(74) *Attorney, Agent, or Firm* — Laurence A. Greenberg; Werner H. Stemer; Ralph E. Locher

(57) ABSTRACT

A method and an apparatus for triggering an emergency shutdown of the inductive charging of a secondary-side component in the form of a motor vehicle by a primary-side component in the form of a charging station, includes a plurality of charging system parts of the secondary-side component. The charging system parts are each configured to interrupt at least one switchable communication channel that connects the charging system parts in order to trigger an emergency shutdown of the inductive charging.

25 Claims, 3 Drawing Sheets

(51) Int. Cl.
*B60L 53/122* (2019.01)
*B60L 53/126* (2019.01)
*B60L 53/30* (2019.01)
*H04L 12/40* (2006.01)
*H04L 29/08* (2006.01)

(52) U.S. Cl.
CPC .......... *B60L 53/126* (2019.02); *B60L 53/305* (2019.02); *B60L 2210/30* (2013.01); *B60L 2240/525* (2013.01); *B60L 2240/527* (2013.01); *B60L 2240/529* (2013.01); *H04L 67/12* (2013.01); *H04L 2012/40215* (2013.01); *H04L 2012/40273* (2013.01); *Y02T 10/70* (2013.01); *Y02T 10/7072* (2013.01); *Y02T 10/72* (2013.01); *Y02T 90/12* (2013.01); *Y02T 90/14* (2013.01); *Y02T 90/16* (2013.01)

(58) Field of Classification Search
CPC ......... B60L 2240/525; B60L 2240/527; B60L 2210/30; B60L 2240/529; Y02T 10/70; Y02T 10/72; Y02T 90/12; Y02T 90/16; Y02T 90/14; Y02T 10/7072; H04L 2012/40273; H04L 67/12; H04L 2012/40215

See application file for complete search history.

(56) References Cited

U.S. PATENT DOCUMENTS

2012/0112535 A1\* 5/2012 Karalis ................. B60L 53/36
                                                        307/10.1
2016/0089988 A1   3/2016 Bartz et al.

FOREIGN PATENT DOCUMENTS

DE   102014219504 A1   3/2016
FR       2992592 A1    1/2014

\* cited by examiner

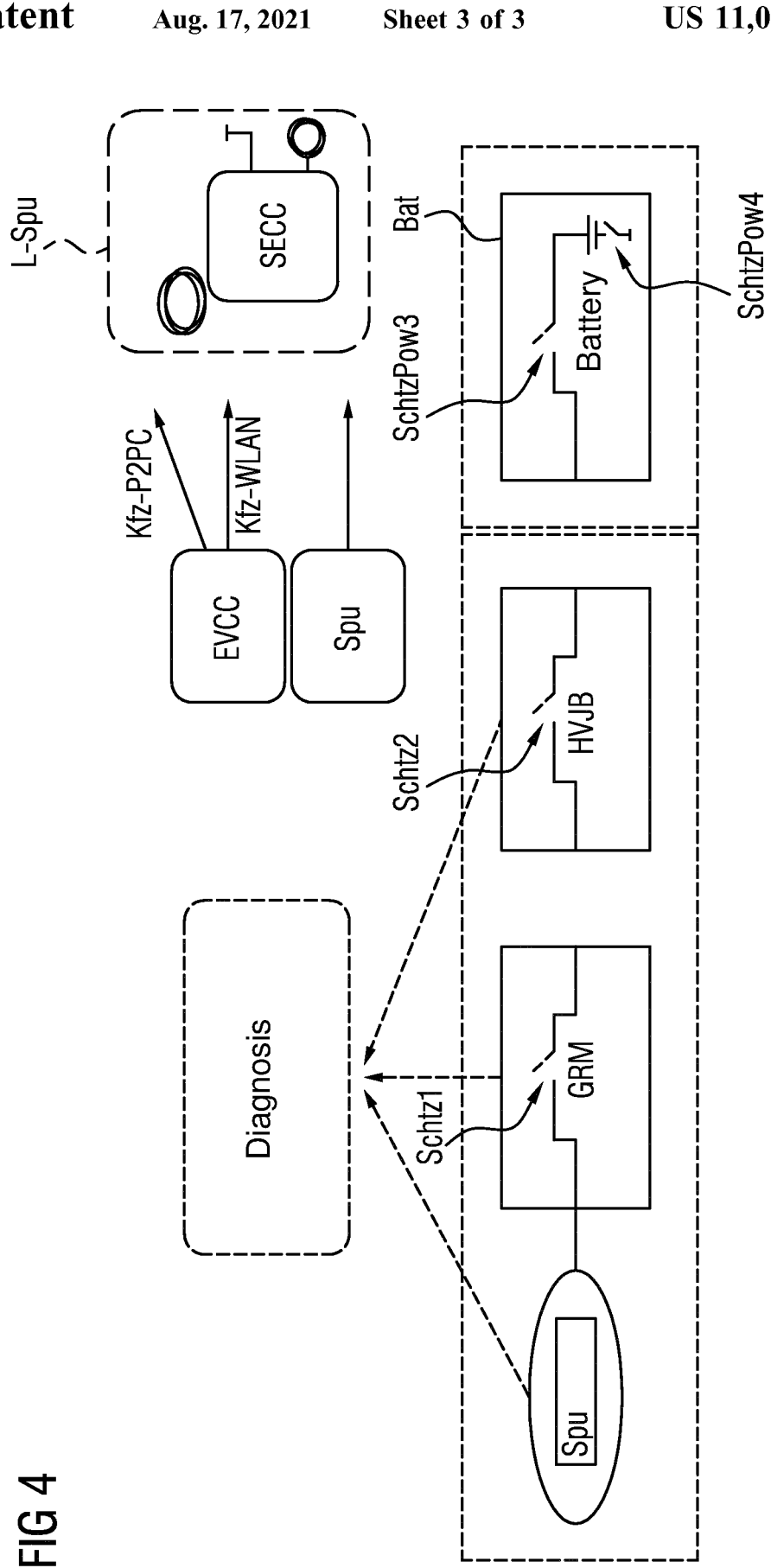

METHOD AND APPARATUS FOR TRIGGERING AN EMERGENCY SHUTDOWN OF THE INDUCTIVE CHARGING OF A MOTOR VEHICLE

BACKGROUND OF THE INVENTION

Field of the Invention

The invention relates to a method and an apparatus for triggering an emergency shutdown of inductive charging.

DE10 2014 219 504.7 describes inductive charging of a motor vehicle having an interrupter relay for the purpose of shutdown.

Wireless charging, in particular the inductive charging of motor vehicles, has been (pre) developed for some time according to at least internally-known prior art. Here, the energy is transmitted by means of the transformer principle over distances of a few centimeters up to approximately 20 cm. In this case, a relatively large magnetic field is produced between the coils, which magnetic field is converted back into electricity after reception on the vehicle side. Said magnetic field and hence the induced currents vary with the regulation bandwidth of the charging system. In general, the charging power decreases, for example, toward the end of the charging operation (battery full). Furthermore, there is a continuous increase, for example, at the beginning of the charging. The charging operation could also be discontinued prematurely if the driver so desires. However, the situation may be more problematic, for example, when the charging operation is intended to be discontinued immediately or the power thereof is intended to be greatly reduced on account of a system fault of any kind (overheating, excessive increase in current or voltage) in order to prevent further damage.

What are known as primary-side-controlled systems are often used, that is to say it is not the load side (motor vehicle) that determines the instantaneous charging power but the charging station which adjusts said power to the demand of the motor vehicle appropriately. This can have the advantage that controllable power components (large, heavy, expensive) do not have to be built into the motor vehicle. However, this also results in the disadvantage that the motor vehicle can request an immediate shutdown only by means of wireless communication and cannot bring about the power interruption by itself (using the contactors of the motor vehicle drive battery could be problematic with respect to the lifetime). Communication via radio can itself also be disturbed in said emergency case, especially if said emergency case is a faulty system state. A shutdown demand via wireless communication technology could thus be more difficult to realize in a satisfactorily reliable and fast manner. One option would be for the charging system in the automobile itself to be able to cause a rapid emergency shutdown.

Thermal fuse protection and safety fuse protection in a vehicle-side power electronics system (for example a rectifier module) of the motor vehicle could have a problem when they could become hot during normal operation. Insofar as it is possible to measure and monitor voltages and temperatures in a comparatively simple manner, in the event of a fault, it would also be possible to actuate an interrupter relay that isolates the affected electric circuit (see DE102014219504.7). However, if they are necessary, HV-switching relays can also be quite large and expensive even though they are used only in emergencies, which occur rarely.

In this respect, in some at least internally known approaches, either no additional fuse protection at all is used or a series relay (see above), which interrupts the charging lines for all poles, or a relay having a fuse, which shorts in serious cases and thus necessarily destroys a built-in fuse (see DE102014219504.7), is used. To this end, data is exchanged by means of vehicle communication and/or via the primary charging unit.

SUMMARY OF THE INVENTION

It is an object of the invention to optimize an emergency shutdown during inductive charging of a motor vehicle. The object is respectively achieved by the embodiments of the independent patent claims. Some particularly advantageous configurations of the invention are specified in the dependent claims and the description. Configurations of the invention can, for example as alternatives to the present solution, make it possible to trigger an emergency shutdown in an efficient and/or redundant and/or reliable manner.

With respect to some configurations of the invention according to the dependent claims:

According to configurations of the invention, it is possible, in particular as the last escalation level when others are unsuccessful, in the case of detection of an interruption of a communications channel (in particular interlock channel), for a motor vehicle drive battery module of a motor vehicle to carry out an emergency shutdown (triggered using the interruption) by disconnecting a motor vehicle drive battery of the motor vehicle with at least one drive battery interruption device (such as one or more contactors), in particular on the part of the motor vehicle drive battery in order to then also prevent greater damage.

According to configurations of the invention, it is possible for one or more charging system parts (in particular an EVCC) to have one or, in particular, more wireless transmission devices, which are designed to transmit an emergency shutdown request from one component (such as the motor vehicle) to the other component (such as the charging station; or vice versa) in the case of the detection of an emergency shutdown trigger in the form of an interruption of a switchable communications channel (for example an interlock channel), wherein, in particular, a transmission device can be designed as a WLAN and/or a transmission device with point-to-point communication and/or near-field radio, etc.

According to configurations of the invention, it is possible for, in particular, a plurality of escalation levels to be provided in such a way that different emergency shutdown mechanisms (such as for example different signaling operations, curbing of the charging power in the charging station, charging stop on the part of the charging device, shutdown of the motor vehicle drive battery with contactors, etc.) are activated, for example, depending on the detection of the exceeding of (where necessary different) limit values, in order to adapt an emergency shutdown in each case, for example, to the significance of problems present.

BRIEF DESCRIPTION OF THE SEVERAL VIEWS OF THE DRAWING

Further features and advantages of some advantageous configurations refinements of the invention will emerge from the following description of some exemplary embodiments of the invention with reference to the drawing, in which, to illustrate some possible configurations of the invention, in each case in a schematically simplifying manner:

FIG. 4 shows a fault detection and signaling operation by means of an (interlock) communications channel.

DETAILED DESCRIPTION OF THE INVENTION

Figure 1:
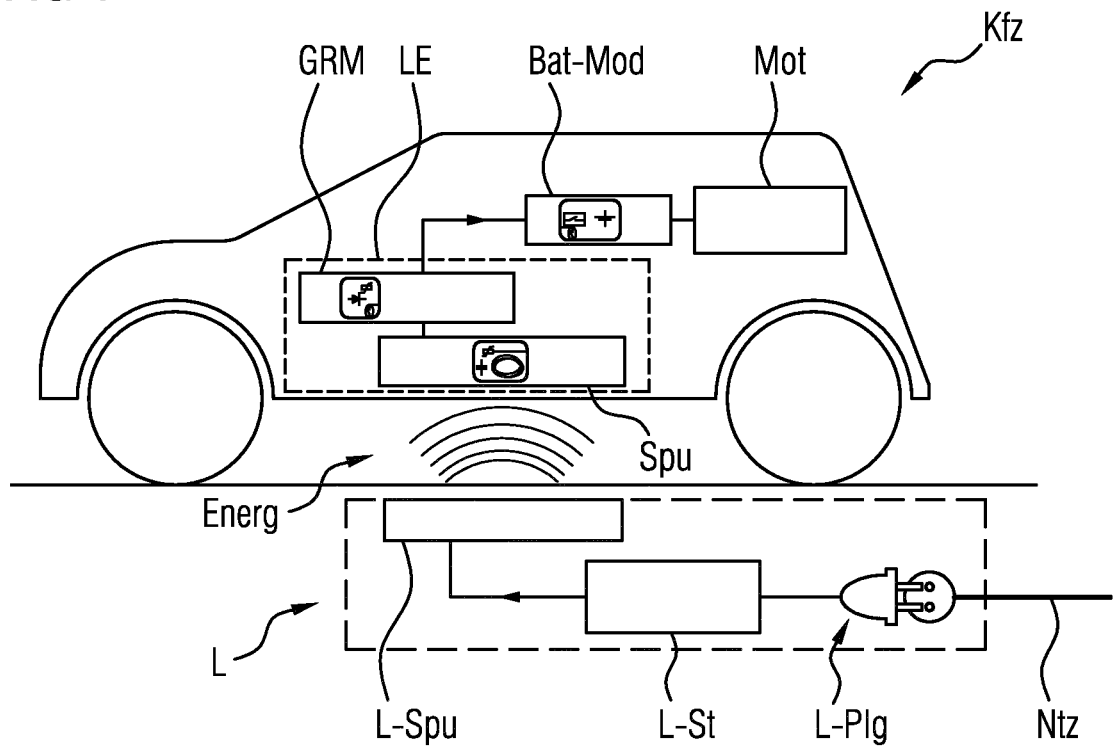
FIG. 1 shows a battery of a motor vehicle, which battery can be charged by a charging station in wireless fashion by means of a motor vehicle charging coil.

FIG. 1 shows by way of example and in a schematically simplified manner with respect to a configuration of the invention an apparatus Vor having a motor vehicle drive battery Bat of a motor vehicle drive battery module Bat-Mod of a motor vehicle Kfz (having an electric motor Mot), which motor vehicle drive battery can be charged in wireless fashion (Energ) by a charging station coil L-Spu of a charging station L (which can be connected, for example by means of a controller L-St and, where necessary, plugs/circuits L-Plg, to a, for example, public grid Ntz) by means of a motor vehicle charging coil Spu and a motor-vehicle-side charging system device LE (having, for example, a rectifier module GRM).

The wireless communication (by means of one or more wireless transmission devices EVCC; WLAN and/or P2PC) between a motor vehicle Kfz and a charging station L serves, for example, for power control of the charging station L by the motor vehicle Kfz. To this end, in addition to a first wireless communication channel (for example WLAN), a second redundant physical (in this case wireless) channel (for example using point-to-point communication, for example NFC or Bluetooth, etc.) P2PC can be used. Provision can thus be made, amongst other things, to exchange necessary/expected charging parameters via WLAN and to use a second inductive communication channel, via which data required only for the basic functions and therefore significantly less information in terms of quantity is exchanged. The second channel can in this case operate at a different frequency to the first and be embodied so that the range thereof is greatly limited (for example approximately 20 cm in order to prevent interference, crosstalk, etc. and to ensure the unambiguous spatial allocation of motor vehicle and parking space). The second channel can be less susceptible to interference precisely because of the low range and the positioning between the motor vehicle Kfz and ground. As a result, for example, despite a possible temporary failure of the first communication, the charging operation can continue. The same also applies for the temporary failure of the second channel. In the event of a fault, the power supply of the charging station can therefore be reduced or ended in a controlled manner despite interference on a channel.

Furthermore, it is possible to provide a further safety device, for example in accordance with an expected draft standard (DKE standard), wherein a simple, unmodulated inductive signal (carrier) from the motor vehicle Kfz to the charging station L can be provided, which signal is intended to ensure the presence of the motor vehicle Kfz above the charging coil L-Spu of the charging station L. If such a signal is not emitted by the motor vehicle Kfz, the charging station L assumes, for example, that there is no chargeable motor vehicle above the primary coil (charging coil L-Spu of the charging station L) and immediately shuts down automatically. Just like the second communication channel P2PC, said signal can also have a very limited range in order to be able to guarantee a relatively precise parking position of the motor vehicle Kfz. Therefore, the power output of the charging station L can thus also be prevented through the interruption of said signal. This can be used, amongst other things, in the case of interference on both communication channels (for example WLAN, P2PC) as an additional safety measure. In addition, the emergency shutdown byway of this path can take place more quickly than in the case of the communication channel, since no data has to be transferred. A disadvantage of this variant can be that it always involves a complete shutdown and no power reduction to a lower value is possible, for which reason, for example, an additional data transmission (additional further information) is proposed.

If both (wireless) communication channels between the motor vehicle Kfz and the charging station L are disturbed and the shutdown of an additional position signal likewise shows no effect, there is also the following "worst case" shutdown for protection of the battery Bat: battery-operated electric vehicles and hybrid vehicles that have an energy store can have one or more contactors SchtzPow3, SchtzPow4 upstream of the connection terminals of the battery Bat (for example for the disconnection from the on-board traction power supply system). With the aid of said one or more contactors SchtzPow3, SchtzPow4 (indicated in FIG. 4), the battery Bat can be disconnected from the rest of the motor vehicle architecture, for example in the event of a faulty function of the motor vehicle Kfz. This can serve both to protect the battery Bat and to protect the motor vehicle architecture (depending on the fault event).

However, since it may be that said disconnection has to be performed in the case of a high flow of current as well, two contactors can therefore be provided for said disconnection, amongst other things. For example, in FIG. 4, there is in each case a drive battery interruption device SchtzPow3, SchtzPow4 (such as, for example, a contactor) fitted to each of the two battery poles of the motor vehicle drive battery Bat for this purpose. This prevents a situation in which disconnection would no longer be possible if a contactor (drive battery interruption device SchtzPow3, SchtzPow4) "sticks" on account of the high switching current. The second contactor SchtzPow4, which does not "stick", can then nevertheless ensure disconnection of the electric circuit (that is to say as redundancy). In order to increase the lifetime of the individual relays and to prevent "sticking" of individual relays/contactors SchtzPow3, SchtzPow4, said shutdown of the motor vehicle drive battery Bat of the motor vehicle Kfz should preferably be used only in safety-critical emergency cases.

A further reason as to why said shutdown during charging should be used only in safety-critical emergency cases is that the contactors SchtzPow3, SchtzPow4 are provided, for example, at the end of the power chain. Therefore, although the motor vehicle drive battery Bat is protected, the components located upstream of the contactors in the power direction can nevertheless still be connected (but in electrically isolated fashion) to the power-generating charging station L. Particularly during inductive charging, high voltages can arise owing to the absence of the motor vehicle drive battery Bat as a load, which voltages could damage the components in the high-voltage grid.

Some magnetic or electrical parameters are expediently checked, in particular, far upstream in the sequence of power-transmitting system parts in order to be able to identify disturbances as early and precisely as possible (as a diagnosis). Even if the individual functional parts (for example resonator, rectifying module, HV distributor and battery) each form a mechanical unit, that is to say are highly integrated, a diagnosis early in the direction of power flow is expedient. It is therefore proposed, in accordance with configurations of the invention, amongst other things, to measure some or all of the following parameters as early as in the resonator (that is to say on the part of the charging coil Spu of the motor vehicle Kfz and/or on the part of a rectifier module GRM of the motor vehicle Kfz) and/or GRM:
  temperature,
  voltage (electrically isolated),
  current (electrically isolated),
  possible hum voltage (electrically isolated),
  possible insulation monitoring.

Figure 2:
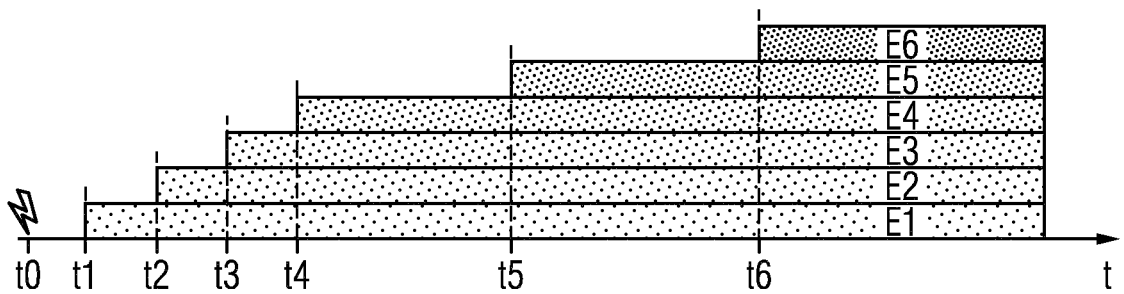
FIG. 2 shows a plurality of escalation levels over time in the event of detection of a fault during charging, having a plurality of emergency shutdown requests and/or an emergency shutdown at the motor vehicle and/or of the motor vehicle drive battery.

As FIG. 2 schematically shows, a step-wise escalation of the fault handling and reaction, which escalation is presented as a procedure, is proposed depending on the type and level, for example in the case of an exceeding of stored/prescribed maximum permissible limit values (absolute maximum ratings). There can be different reactions to individual faults measured in this way. If the temperature of power-carrying components reaches, for example, a prescribed first "low" threshold value, one possible reaction thereto can thus be to switch on the motor vehicle fan and thus to reduce the temperature of the entire assembly. If a second prescribed "average" limit value is exceeded, one reaction can be to reduce the charging power in order to thereby counteract further heating. If the temperature nevertheless increases further and reaches a prescribed "upper" limit value, the power supply will be, for example, completely interrupted in order to prevent damage to the components. This would be just one of many possible embodiments.

There are also fault cases such as, for example, overvoltage, in which an immediate shutdown may be necessary or expedient.

In the following text, a detected fault state of increasing temperature is intended to be explained in more detail by way of example.

FIG. 2 shows a plurality of escalation levels E1, E2, E3, E4, E5, for example over time t, in the event of detection of a fault during charging, having a plurality of emergency shutdown requests and/or an emergency shutdown in the motor vehicle Kfz.

As FIG. 2 shows, the charging of the motor vehicle drive battery Bat of the motor vehicle drive battery module Bat-Mod of the motor vehicle Kfz is intended to be able to be reduced in the event of detection of a fault (such as, for example, an increased temperature at the time t0) after transmission (for example via a data bus CAN) of the message therefrom and analysis of the fault state (as first step E1) and in a severe fault event to be able to be interrupted in a reliable manner.

If there is a need (for example in the event of an ascertained fault) for power reduction of the inductive charging or an (emergency) shutdown of the inductive charging, as a further step E2, a power reduction request or an emergency shutdown request NotAnf is sent, for example by means of a wireless transmission device (for example by EVCC via WLAN), from the motor vehicle Kfz to the charging station Lad.

In the next step E3, for example in the case of a delay of a reaction (for example of the charging station L), the shutdown command will additionally be sent, amongst other things, by means of a further wireless transmission device (in this case, for example, P2PC) if the fault type and significance permit this time delay.

A further attempt of an (emergency) shutdown could (as step E4) be attempted by means of the further wireless transmission device (in this case, for example, P2PC). This could happen at the same time as the escalation step in step E3 but also in a time-offset manner (as shown schematically in FIG. 2). Only when the charging station L has not yet reacted and further waiting for same can no longer be tolerated (for example in the case of danger of irreversible damage) is (for example in addition to a bus signal on a communications channel CAN) a (first/further) communications channel (also called interlock here) from the fault-detecting unit (for example rectifier module GRM or battery module Bat-Mod) interrupted (in a step E5) by means of, for example, a (cheap) small-signal relay or a semiconductor switch etc. as interruption circuit, whereupon (after detection of the interruption) the drive battery module Bat-Mod as last escalation step opens (E6) the circuit for the motor vehicle drive battery Bat in a reliable manner by means of, for example, at least one HV contactor SchtzPow3, SchtzPow4 etc. and the charging of the motor vehicle drive battery Bat is thus forcibly ended on one side on the motor vehicle side (for example similarly to pulling the plug out on a computer). In the event of severe faults (or "violent faults"), all of the escalation planes or steps E1-E5 can also be activated simultaneously immediately in the case of identification of a fault. All of this can be possible without further large and expensive HV interrupter relays in the charging components.

Conversely, the primary station (charging station L) could also transmit a shutdown demand to the motor vehicle Kfz if said charging station (L) is no longer capable, for example, of its own shutdown. In order that an interruption demand in an emergency case from the charging system of the motor vehicle Kfz is obeyed reliably, the communication module EVCC of said motor vehicle can signal, for example, in particular by means of an interruption of a communications channel (in the form, for example, of an interlock, for example in addition to a (for example CAN) bus connection CAN) to the drive battery module Bat-Mod (vehicle battery) (which can disconnect the motor vehicle drive battery, for example, using contactors).

The idea according to the invention can also accordingly be used for a bidirectional flow of power and also for the stationary device.

All or some of the charging system parts (essentially, for example, rectifier module GRM, charging unit Spu/HVJB, motor vehicle drive battery Bat) that operate in the vehicle group (that is to say in the motor vehicle Kfz) can report and initiate an emergency shutdown request NotAnf to the primary station (charging station L), for example wirelessly, at any time and automatically on account of an inherent diagnosis.

For example, all of the available, in particular wireless, communication channels (for example short range/WLAN and near-field/inductive) can be used, for example simultaneously and in parallel with the transmission of an emergency shutdown request NotAnf (which can be fast, reliable and redundant). All or some of the charging system parts (essentially, for example, rectifier module GRM, charging unit Spu/HVJB, motor vehicle drive battery module Bat-Mod) that operate in the vehicle group (that is to say in the motor vehicle Kfz) can be connected to one another outside of a communications channel in the form, for example, of a data bus CAN or else by means of a further communications channel InterLck (such as, in particular, a common interlock channel).

An interruption of a communications channel InterLck (in particular in the form of a common interlock channel) that is initiated on the vehicle-side (Kfz) can trigger, for example, an emergency shutdown request NotAnf (of a motor vehicle communication controller EVCC that detects this) to a charging station L, wherein the emergency shutdown request can also be communicated to all or some group participants (such as charging system parts, in particular, for example, rectifier module GRM, charging unit Spu/HVJB, motor vehicle drive battery Bat) among one another redundantly (for example in addition to the communications channel CAN).

The switchable further communications channel InterLck can thus be used for additional emergency shutdown alerting. Such a switchable element can be safe and inexpensive on account of low currents and voltages (low voltage).

Such an alarm architecture in each case in the motor vehicle Kfz and/or (with respect to wireless transmission) designed in duplicate from the motor vehicle Kfz could be relatively insusceptible to faults and/or rapid and/or inexpensive.

Figure 3:
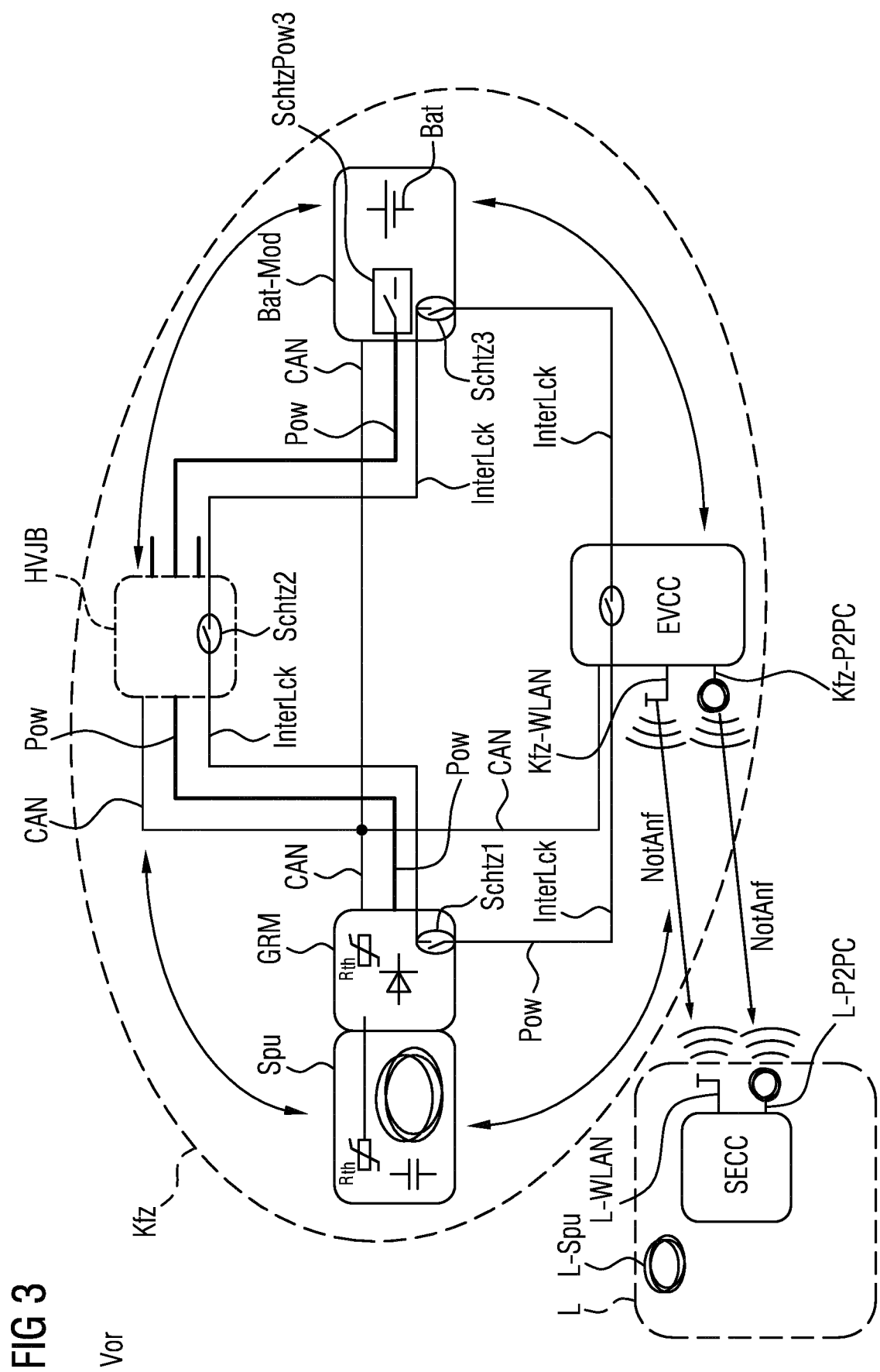
FIG. 3 shows communication devices on the part of the charging station and on the part of the charging system parts of a motor vehicle.

FIG. 3 shows by way of example with respect to one configuration (Vor) of the invention, as in FIG. 1, for reasons of clarity, just one (in this case channel-connected) communication between a plurality of charging system parts GRM, HVJB, Bat, EVCC on the part of the motor vehicle Kfz that are connected to one another by means of at least one first and possibly second/further communications channel(s) (in particular in this case InterLck—and/or possibly also CAN and/or Pow) that can be switched (for example by contactors Schtz1, Schtz2, Schtz3, semiconductors, thyristors etc.), namely in this case between a rectifier module GRM (connected using a charging coil module L-SP-Mod to a charging coil Spu), a high-voltage distributor (or high-voltage junction box) HVJB, a chargeable motor vehicle drive battery Bat, and a motor vehicle communication controller (or electric vehicle communication controller) EVCC.

On the part of a plurality/each of said charging system parts GRM, HVJB, Bat, EVCC on the part of the motor vehicle Kfz, it is possible to trigger there, for example by way of a controller etc., an interruption of (at least) one switchable communications channel InterLck there, which interruption can be detected, for example, in the motor vehicle communication controller EVCC and can cause the latter, for example, to transmit an emergency shutdown request (NotAnf) as a demand for emergency shutdown to the charging system L, for example by means of a or in this case of a plurality of wireless-communication devices provided for wireless communication (in each case transmission devices and/or reception devices) Kfz-WLAN, Kfz-P2PC (and possibly Kfz-Spu) on the part of the motor vehicle Kfz.

FIG. 3 furthermore shows by way of example with respect to one configuration of the invention (one, two, three or more) wireless-communication devices (in each case transmission devices and/or reception devices) L-WLAN, L-P2PC, L-Spu on the part of the charging station L, for wireless communication using wireless-communication devices (in each case transmission devices and/or reception devices) Kfz-WLAN, Kfz-P2PC, Kfz-Spu on the part of the motor vehicle Kfz.

The wireless-communication devices (in each case transmission devices and/or reception devices) can be, in particular, WLAN-communication devices and/or P2PC-communication devices and/or charging coils (moreover used for charging with energy Energ) on the part of the charging station L and of the motor vehicle Kfz.

The wireless-communication devices Kfz-WLAN, Kfz-P2PC, Kfz-Spu on the part of the motor vehicle Kfz can be designed (in the event of detection of an interruption, for example, of a communications channel Interlck) to cause an emergency shutdown (for example power curbing and/or complete emergency shutdown) by the charging station L by sending at least one emergency shutdown request (for example via Kfz-WLAN, Kfz-P2PC, Kfz-Spu) to said charging station L.

FIG. 4 shows some charging system parts GRM, HVJB, Bat, EVCC on the part of the motor vehicle Kfz, which parts can diagnose a fault such as, for example, excessive temperature etc. (indicated using dashes as "diagnosis" step), and by interruption (using a relay or semiconductor etc.) of a switchable communications channel InterLck, which interruption can be detected, for example, in the motor vehicle communication controller EVCC, can cause a motor vehicle communication controller EVCC, for example, to transmit an emergency shutdown request (NotAnf) as a demand for emergency shutdown to the charging system L, for example by means of one or more wireless-communication devices Kfz-WLAN, Kfz-P2PC, Kfz-Spu provided for wireless communication on the part of the motor vehicle Kfz.

The invention claimed is:

1. An apparatus for triggering an emergency shutdown of an inductive charging system for a vehicle, the apparatus comprising:
   at least two different types of communication channels enabling communication between the vehicle and a charging station in order to trigger an emergency shutdown of the inductive charging system; and
   a plurality of escalation levels permitting different emergency shutdown mechanisms to be activated.

2. The apparatus according to claim 1, wherein said plurality of escalation levels includes one or more of different signaling operations, curbing of charging power in a charging station, a charging stop by a charging station, or electrically disconnecting a motor vehicle drive battery.

3. The apparatus according to claim 2, wherein said plurality of escalation levels are activated in dependence on a detection of exceeding different limit values.

4. The apparatus according to claim 3, which further comprises a motor vehicle drive battery module of the vehicle being configured, upon detection of an interruption of said communication channel, to perform an emergency shutdown by disconnecting the vehicle drive battery of the vehicle using at least one drive battery interruption device.

5. The apparatus according to claim 4, which further comprises one or more charging system parts having at least one wireless transmission device configured to transmit an emergency shutdown request from one part to another part upon a detection of an emergency shutdown triggering in the form of an interruption of said switchable communication channel.

6. The apparatus according to claim 3, wherein one of said escalation levels includes detecting a temperature of power-carrying components reaching a prescribed first "low" threshold value and switching on a motor vehicle fan.

7. The apparatus according to claim 3, wherein one of said escalation levels includes detecting a temperature exceeding a prescribed "average" limit value and reducing the charging power.

8. The apparatus according to claim 3, wherein one of said escalation levels includes detecting a temperature reaching a prescribed "upper" limit value and completely interrupting a power supply.

9. The apparatus according to claim 5, wherein the charging system parts include at least one of a rectifier module, a battery module, a high-voltage distributor, or a communication controller.

10. The apparatus according to claim 1, wherein said communication channel includes a transmission device having a WLAN transmission device, a near-field transmission device, or a transmission device using charging coils to transmit an emergency shutdown request.

11. A motor vehicle, comprising:
a motor vehicle inductive charging system for receiving power from a charging station;
the motor vehicle being configured to trigger an emergency shutdown of a charging operation;
the motor vehicle including at least two different types of communication channels configured to communicate with the charging station;
the motor vehicle being configured to communicate a trigger for an emergency shutdown of said inductive charging system via said at least two different types of communication channels; and
a plurality of escalation levels permitting the vehicle to activate different emergency shutdown mechanisms.

12. The vehicle according to claim 11, which further comprises transmission devices each configured to transmit an emergency shutdown request from the motor vehicle to the charging station to trigger an emergency shutdown at the charging station.

13. The vehicle according to claim 11, wherein said communication channel includes a WLAN transmission or a near-field transmission or a transmission using charging coils to transmit an emergency shutdown request.

14. The vehicle according to claim 11, wherein an activation of different emergency shutdown mechanisms is dependent on a detection of exceeding limit values.

15. The vehicle according to claim 11, wherein the vehicle is configured to measure at least one parameter of at least one of a charging coil or a rectifier module selected from the group consisting of:
temperature,
voltage,
current,
hum voltage and
insulation monitoring, and
the measured parameters are taken into account for a decision about the triggering of an emergency shutdown or a type of emergency shutdown of said inductive charging system.

16. The vehicle according to claim 15, wherein:
the vehicle includes a plurality of charging system parts being interconnected by a switchable communications channel and interconnected by a further non-switchable or switchable communications channel; and
at least one wireless or wired transmission device is configured to transmit an emergency shutdown request upon detecting an interruption of said switchable communications channel.

17. The vehicle according to claim 14, which further comprises a further communications channel additionally configured to send a shutdown escalation step request upon a delay of a reaction to a first request.

18. The vehicle according to claim 17, wherein the shutdown escalation step includes transmitting a power reduction request or an emergency shutdown request.

19. The vehicle according to claim 17, wherein the vehicle is configured to open a circuit for a vehicle drive battery if no reaction to the first request and no reaction to the shutdown escalation step request occur.

20. A method for triggering an emergency shutdown of the inductive charging of a secondary-side charging system component in the form of a vehicle by a primary-side charging system component in the form of a charging station, the method comprising the following steps:
providing at least two different types of communication channels enabling communication between the vehicle and the charging station in order to trigger an emergency shutdown of the secondary-side charging system; and
communicating, via at least one of said at least two different types of communication channels, a plurality of escalation levels permitting different emergency shutdown mechanisms to be activated.

21. The method according to claim 20, which further comprises including in the plurality of escalation levels:
at least one of different signaling operations, curbing of a charging power in the charging station, a charging stop by a charging device, or an electrical disconnection of a vehicle drive battery.

22. The method according to claim 20, which further comprises activating the plurality of escalation levels in dependence on a detection of exceeding different limit values.

23. The method according to claim 20, which further comprises transmitting an emergency shutdown request upon detecting an interruption of the communication channel.

24. The method according to claim 20, which further comprises using a further communications channel to send a shutdown escalation step request upon a delay of a reaction to a first request.

25. The method according to claim 24, which further comprises opening a circuit for a vehicle drive battery if no reaction to the first request and no reaction to the shutdown escalation step request occur.

* * * * *